(12) United States Patent
Stenneth et al.

(10) Patent No.: US 9,365,213 B2
(45) Date of Patent: Jun. 14, 2016

(54) MODE TRANSITION FOR AN AUTONOMOUS VEHICLE

(71) Applicant: HERE Global B.V., Veldhoven (NL)

(72) Inventors: Leon Oliver Stenneth, Chicago, IL (US); Vladimir Boroditsky, Northbrook, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/266,085

(22) Filed: Apr. 30, 2014

(65) Prior Publication Data

US 2015/0314780 A1 Nov. 5, 2015

(51) Int. Cl.
*B60W 30/00* (2006.01)
*G05D 1/00* (2006.01)
*B60W 50/00* (2006.01)

(52) U.S. Cl.
CPC ............ *B60W 30/00* (2013.01); *G05D 1/0061* (2013.01); *B60W 2050/007* (2013.01); *G05D 2201/0213* (2013.01)

(58) Field of Classification Search
CPC .................. B60W 30/182; B60W 2050/0062; B60W 2050/0095; B60W 2050/0096; B60W 30/00; B60W 30/02; B60W 2050/007; G05D 1/021; G05D 2201/0213
See application file for complete search history.

(56) References Cited

U.S. PATENT DOCUMENTS

| | | | |
|---|---|---|---|
| 8,078,349 B1 | 12/2011 | Prada Gomez et al. | |
| 8,718,861 B1 * | 5/2014 | Montemerlo et al. | 701/26 |
| 8,812,186 B2 * | 8/2014 | Oh et al. | 701/23 |
| 8,880,270 B1 * | 11/2014 | Ferguson et al. | 701/23 |
| 8,954,217 B1 * | 2/2015 | Montemerlo et al. | 701/26 |
| 2007/0203617 A1 | 8/2007 | Haug | |
| 2011/0071718 A1 * | 3/2011 | Norris et al. | 701/23 |
| 2012/0083959 A1 | 4/2012 | Dolgov et al. | |
| 2012/0083964 A1 | 4/2012 | Montemerlo et al. | |
| 2013/0211656 A1 | 8/2013 | An et al. | |
| 2013/0253754 A1 * | 9/2013 | Ferguson et al. | 701/28 |
| 2014/0132082 A1 * | 5/2014 | McGinn et al. | 307/125 |
| 2014/0136045 A1 * | 5/2014 | Zhu et al. | 701/23 |
| 2014/0136414 A1 * | 5/2014 | Abhyanker | 705/44 |
| 2014/0330478 A1 * | 11/2014 | Cullinane et al. | 701/23 |

OTHER PUBLICATIONS

European Search Report cited in EP15160938, mailed Sep. 9, 2015.

* cited by examiner

*Primary Examiner* — Rodney Butler
(74) *Attorney, Agent, or Firm* — Lempia Summerfield Katz LLC

(57) ABSTRACT

An autonomous vehicle may be operable in an autonomous mode and a manual mode. A confidence threshold is accessed from a database. The confidence threshold may be associated with a particular geographic area containing the autonomous vehicle. The confidence threshold may be constant for the geographic area accessible by the autonomous vehicle. A computing device calculates a vehicle confidence level based on at least one confidence factor and compares the confidence threshold to the vehicle confidence level. The computing device generates a driving mode command for a vehicle based on the comparison. In one example, the driving mode command transitions the autonomous vehicle to the autonomous mode, if applicable, when the vehicle confidence score exceeds the confidence threshold. In one example, the driving mode command transitions the autonomous vehicle to the manual mode, if applicable, when the vehicle confidence score does not exceed the confidence threshold.

19 Claims, 10 Drawing Sheets

145

| FUNCTIONAL CLASS | MULTIPLIER |
|---|---|
| 1 | 1 |
| 2 | 5 |
| 3 | 10 |
| 4 | 15 |
| 5 | 15 |

| DRIVING SENSORS | ROAD STATUS SENSORS | PARKING SENSORS | CORRECTNESS MULTIPLIER |
|---|---|---|---|
| 1 | 1 | 1 | 0.3 |
| 1 | 2 | 0 | 0.3 |
| 2 | 4 | 0 | 0.6 |
| 2 | 4 | 1 | 0.6 |
| 6 | 2 | 2 | 1.0 |
| 8 | 3 | 3 | 1.0 |
| 0 | 0 | 0 | 0.0 |

FIG. 5B

MODE TRANSITION FOR AN AUTONOMOUS VEHICLE

FIELD

The following disclosure relates to the transition of modes of an autonomous vehicle, or more particularly, confidence levels for controlling the transition of modes of an autonomous vehicle.

BACKGROUND

The term autonomous vehicle refers to a vehicle including automated mechanisms for performing one or more human operated aspects of vehicle control. As autonomous vehicles are adopted, several benefits may be realized. Vehicle collisions may be reduced because computers can perform driving tasks more consistently and make fewer errors than human operators. Traffic congestion may be alleviated because autonomous vehicles observe specified gaps between vehicles, preventing stop and go traffic. The reduced traffic and increased safety may lead to higher speed limits.

Autonomous vehicles may allow drivers to focus their attention elsewhere, such as working on a laptop, talking on a phone, or sleeping. Impaired people that may otherwise be unable to drive may be able to operate an autonomous vehicle. Parking options in urban errors may be improved because autonomous vehicles may drop off passengers and then park in a more remote location.

However, autonomous vehicles may be operable only on certain roads or certain types of roads. Autonomous vehicle passengers may need to operate the vehicles in some areas. Challenges remain in providing transitions between automated mode and human operated mode.

SUMMARY

In one embodiment, an autonomous vehicle may be operable in an autonomous mode and a manual mode. A confidence threshold is accessed from a database. The confidence threshold may be associated with a particular geographic area containing the autonomous vehicle. The confidence threshold may be constant for the geographic area accessible by the autonomous vehicle. A computing device calculates a vehicle confidence level based on at least one confidence factor and compares the confidence threshold to the vehicle confidence level. The computing device generates a driving mode command for a vehicle based on the comparison. In one example, the driving mode command transitions the autonomous vehicle to the autonomous mode, if applicable, when the vehicle confidence score exceeds the confidence threshold. In one example, the driving mode command transitions the autonomous vehicle to the manual mode, if applicable, when the vehicle confidence score does not exceed the confidence threshold.

BRIEF DESCRIPTION OF THE DRAWINGS

Exemplary embodiments of the present invention are described herein with reference to the following drawings.

FIG. 5A illustrates an example look up table for confidence thresholds.

FIG. 5B illustrates another example look up table for vehicle confidence scores.

DETAILED DESCRIPTION

Some autonomous vehicles may include a completely driverless mode in which no passengers are onboard. These autonomous vehicles may park themselves or move cargo between locations without a human operator. Autonomous vehicles may include multiple modes and transition between the modes. A highly assisted driving mode may not completely replace the human operator. In the highly assisted driving mode, the vehicle may perform some driving functions and the human operator may perform some driving functions. The vehicles may also be driven in a manual mode in which the human operator exercises a degree of control over the movement of the vehicle. The vehicles may also include the completely driverless mode. Other levels of automation are possible.

The transition between driving modes may be automatic or manual. The mode transition may be between the driverless mode and the manual mode, between the highly assisted driving mode and the manual mode, or between the highly assisted driving mode and the automatic mode. A manual transition may be controlled by the press of a button, lever, or touchscreen within the vehicle. The automatic transition may be made by the vehicle. The transition may be based on confidence levels.

The vehicle may calculate a vehicle confidence level based on the current external conditions the vehicle is facing. The vehicle confidence level may be compared to a threshold value to determine the appropriate mode for the vehicle. Alternatively, the vehicle confidence level may be compared to a geographic confidence level that describes the requisite confidence for the current geographic area.

Figure 1:
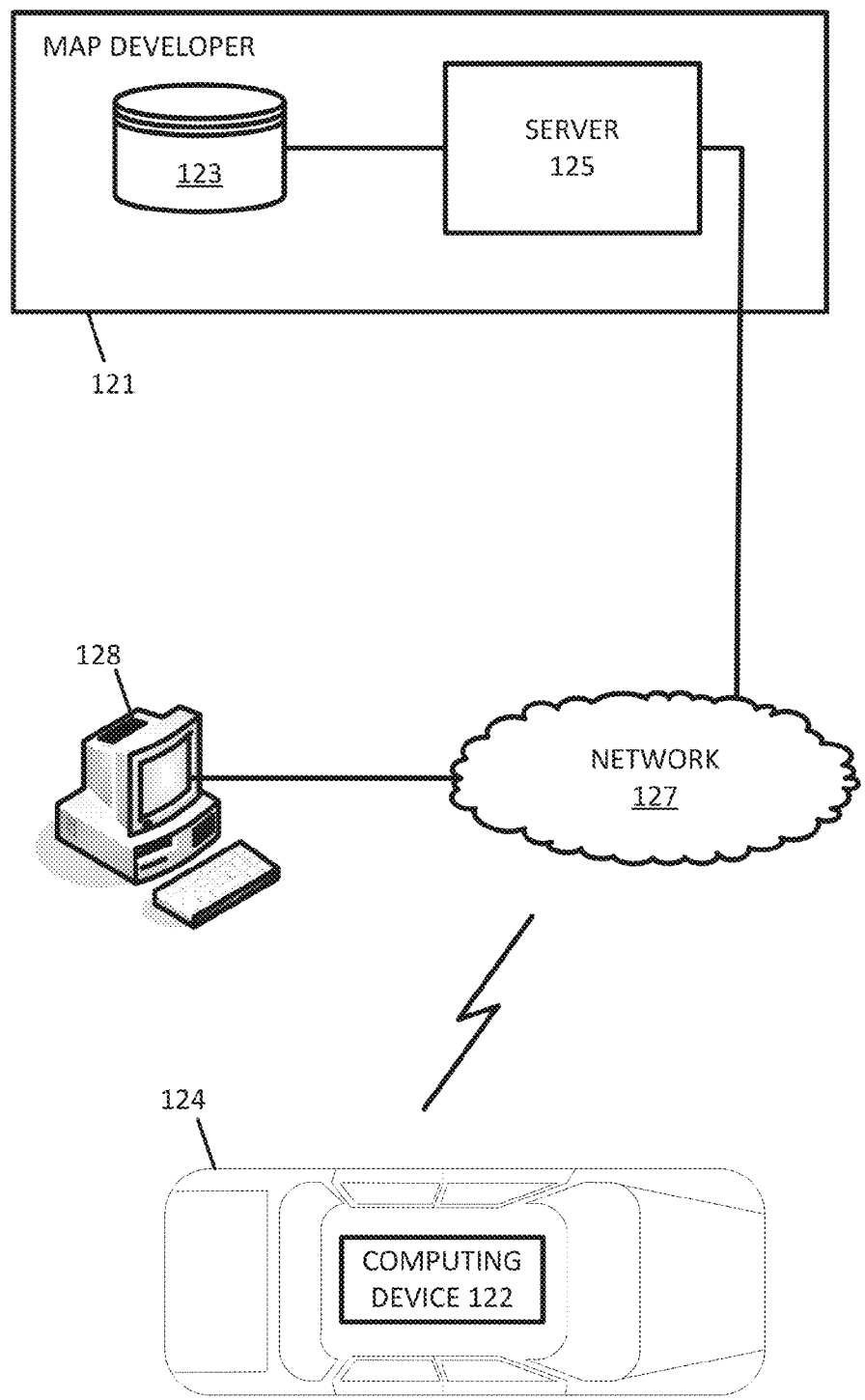
FIG. 1 illustrates an example system for mode transition for an autonomous vehicle.

FIG. 1 illustrates an example system 120 for mode transition for an autonomous vehicle. The system 120 includes a developer system 121, one or more computing devices 122, a workstation 128, and a network 127. Additional, different, or fewer components may be provided. For example, many computing devices 122 and/or workstations 128 connect with the network 127. The developer system 121 includes a server 125 and a database 123. The developer system 121 may include computer systems and networks of a system operator.

The computing device 122 may be carried by a vehicle 124. The computing device 122 may be a specialized autonomous driving computer. The computing device 122 may calculate a vehicle confidence level based on at least one confidence factor. The confidence factors may be based on sensor data collected at the vehicle, environmental data received through the network 127, or responsiveness of the vehicle 124. Alternatively, the computing device 122 may report sensor data to the server 125, which calculates the vehicle confidence level.

The computing device 122 or the server 125 may perform a comparison to the vehicle confidence value to a confidence threshold. The computing device 122 generates a driving mode command for the vehicle 124 based on the comparison. When the vehicle confidence exceeds the confidence threshold, the computing device 122 determines that the conditions are suitable for autonomous driving. Thus, the driving mode command includes data for a transition to or to remain in the autonomous mode for the vehicle 124. When the vehicle confidence is less than the confidence threshold, the computing device 122 determines that the conditions are unsuitable for autonomous driving. Thus, the driving mode command includes data for a transition to or to remain in the manual mode for vehicle 124.

The confidence threshold may be stored in database 123. The confidence threshold may be associated with a geographic area. The confidence threshold may be constant through the geographic area. Thus, some vehicles may use the same confidence threshold at all times. In other example, the confidence threshold may change as the vehicles travel.

The computing device 122 may be a device that is in communication with the autonomous driving computer built-in to the vehicle 124. The computing device 122 may perform the confidence comparison and send the results to the autonomous driving computer. The computing device 122 may be a mobile device such as a smart phone, a mobile phone, a personal digital assistant ("PDA"), a tablet computer, a notebook computer, a navigation device, and/or any other known or later developed portable or mobile computing device.

The optional workstation 128 is a general purpose computer including programming specialized for the following embodiments. For example, the workstation 128 may receive user inputs for the confidence threshold or the confidence factors.

The developer system 121, the workstation 128, and the computing device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the computing device 122. In some embodiments, the server 125 performs a majority of the processing for calculating the vehicle confidence value and the comparison with the confidence threshold. In other embodiments, the computing device 122 or the workstation 128 performs a majority of the processing. In addition, the processing is divided substantially evenly between the server 125 and the computing device 122 or workstation 128.

Figure 2:
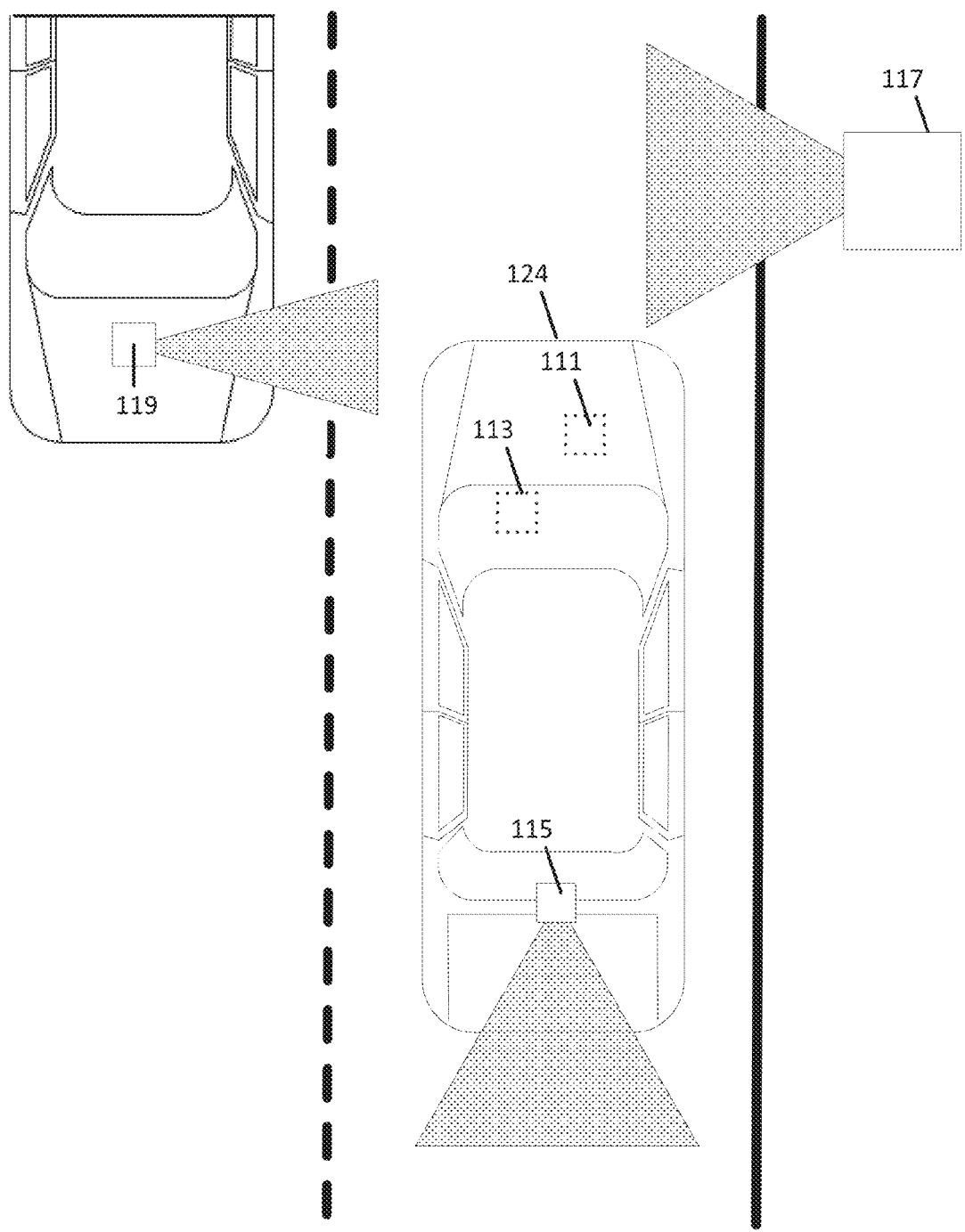
FIG. 2 illustrates example sensors for vehicle confidence.

FIG. 2 illustrates example sensors for vehicle confidence. The sensors may be organized in to overlapping or non-overlapping categories. One classification of sensors includes internal vehicle sensors (e.g., sensors 111 and 113), external vehicle sensors (e.g., sensors 115 and 119), and stationary sensors (e.g., sensors 117). Another classification of sensors may include driving sensors (e.g., sensors 111, 113 and 115), road status sensors (e.g., sensors 115, 117, and 119), and parking sensors (e.g., sensors 111 and 113).

Engine sensors 111 may include throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Vehicle sensors 113 may include a steering wheel angle sensor, a speedometer sensor, or a tachometer sensor. When the vehicle 125 is traveling higher than a predetermined speed the vehicle confidence level may be raised. In another example, when the brake is pressed at a predetermined pressure, the vehicle confidence level may be raised. In another example, when the steering wheel is turned to a predetermined angle, the vehicle confidence level may be raised.

The external vehicle sensor 115 may be a camera, a light detection and ranging (LIDAR) sensor, a radar sensor, or an ultrasonic sensor. The external vehicle sensor 115 may determine road status such as the shape or turns of the road, the existence of speed bumps, the existence of pot holes, the wetness of the road, or the existence or ice, snow, or slush.

The secondary vehicle sensor 119 may be a camera, a LIDAR sensor, a radar sensor, or an ultrasonic sensor. The secondary vehicle sensor 119 may mounted on another vehicle. The secondary vehicle sensor 119 may be a backup sensor for detecting the speed of the vehicle 124. The secondary vehicle sensor 119 may detect the weather in the vicinity of the vehicle 124.

The stationary sensor 117 may be a camera, a LIDAR sensor, a radar sensor, or an ultrasonic sensor. The stationary sensor 117 may be a backup sensor for detecting the speed of the vehicle 124. The stationary sensor 117 may detect the weather in the vicinity of the vehicle 124. The stationary sensor 117 may detect traffic levels of the roadway.

One or more of the sensors may be weather sensors such as wiper blade sensors, rain sensors, temperature sensors, barometric sensors, or other types of sensors related to the weather. Rain, sleet, snow, fog, or barometric changes may be indicative of more hazardous driving conditions and may lower the vehicle confidence level. Temperatures below freezing, especially in combination with other weather conditions, may be indicative of more hazardous driving conditions and may lower the vehicle confidence level.

One or more of the sensors may include infotainment sensors. The infotainment sensor may be an AM/FM sensor or a video sensor. The infotainment sensor may receive traffic message channel broadcasts. Traffic data in the broadcasts may be used to modify the vehicle confidence level. Also, when the radio is played above a certain level or video is being watched, the vehicle confidence level may be raised so that the vehicle enters autonomous mode, which is preferred to a distracted manual driver.

One or more of the sensors may include parking sensors. The parking sensor category may include any combination of seat belt sensors, door sensors, or a gear shift sensor. Various indicators from the parking sensors may be used to determine that the vehicle 124 is parking or moving away from a parking spot. The indicators may be fastening seatbelts, closings doors, or shifting to a higher gear. In one example, the vehicle confidence level is raised as the vehicle 124 is successfully moved from a parking spot.

One or more of the vehicle sensors 113 may detect a driver. The sensor 113 may be an eye gaze sensor or a video sensor that determines whether the driver is asleep or has been nodding off or whether the driver is paying attention to the road ahead. The sensor 113 may be a weight sensor that determines whether an adult sized driver is in the driver's seat. The sensor 113 may be a breathalyzer that detects the breath of the driver to estimate the blood alcohol content of the driver. When the driver is drowsy, nonexistent, or impaired as indicated by the sensor 113, the vehicle confidence value may be raised to increase the likelihood that the vehicle 124 enters the autonomous mode.

The sensors data may be sent to an automotive cloud stored at database 123 or at the server 125 through network 127. The vehicles 124 may submit and download data from the automotive cloud. The data from other vehicles stored in the automotive cloud may be used to modify the vehicle confidence level or define the confidence threshold.

Figure 3A:
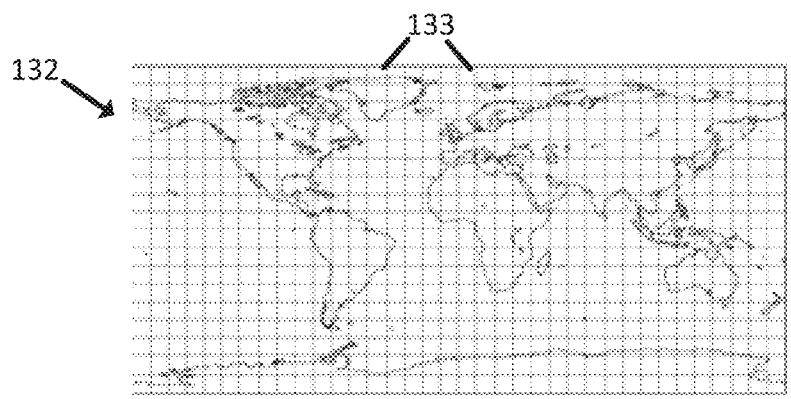
FIG. 3A illustrates example set of geographic zones.

FIG. 3A illustrates example set of geographic zones 133. The world 132 or any other geographic area may be divided into geographic zones 133. In one example, the geographic zones 133 are defined according to the amateur (ham) radio grids that divide the earth into 324 zones (18 divisions in the longitude direction and 18 divisions in the latitude direction). The geographic zones 133 may be designated by two character alphanumeric codes.

The geographic zones 133 may be divided into other sized intervals. In one example, the geographic zones 133 may encompass a predetermined geographic space (e.g., 1 square mile, 1 square kilometer, 10 square miles or another value). The geographic zones 133 may be defined according to jurisdictions or governmental authority (e.g., by county, by city, by state, or by country). The government authority may set the confidence threshold or a geographic confidence level.

Figure 3B:
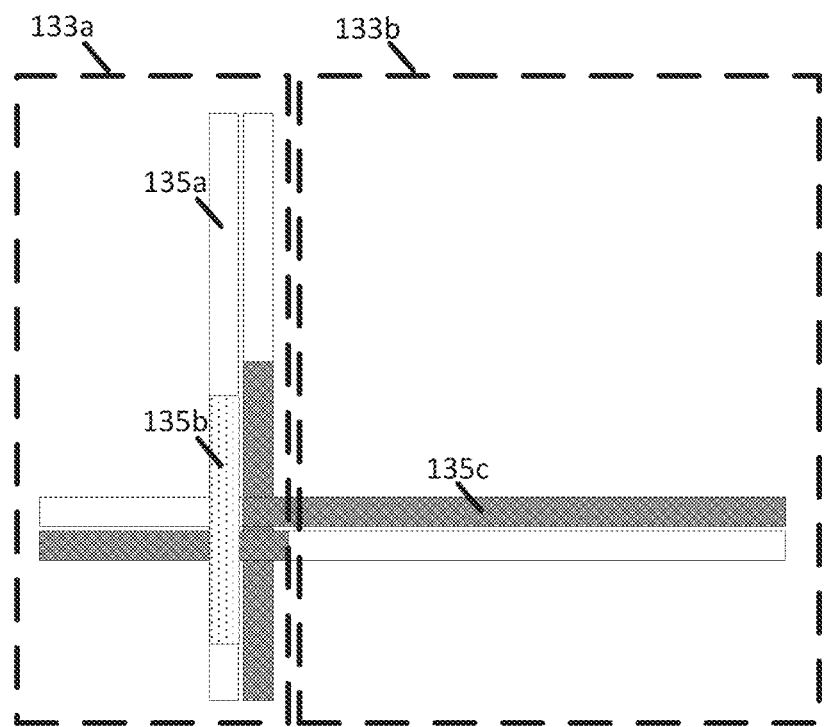
FIG. 3B illustrates another example set of geographic zones.

FIG. 3B illustrates another example set of geographic zones. The geographic zones may represent individual path segments or sets of path segments. For example, a highway from point A to B may be in a single geographic zone. FIG. 3B illustrates geographic zones 133a and 133b, which are of unequal size.

The sensors may include global positioning system (GPS) or the computing device 122 includes one or more detectors or sensors as a positioning system built or embedded into or within the interior of the computing device 122. The computing device 122 receives location data for geographic position from the positioning system.

The computing device 122 receives location data for the vehicle 124 in the geographic area. The computing device 122 compares the location data to the geographic zones 133 to identify the current geographic zone of the vehicle 124. For example, the computing device 122 may access the database 123 is according to the location data to receive the confidence threshold for the corresponding geographic zone or grid. Alternatively, the location data may be sent to the server 125, which determines the appropriate geographic zone.

The confidence thresholds for the geographic zones may be maintained by the server 125 or another device. The confidence thresholds may be set at a default value and increased or decreased depending on the conditions found within the geographic zones. Factors that impact the confidence thresholds include weather, traffic, the type of road and road features, data from road sensors, vehicle data from recent vehicles in the zone, blind spots in the zone, incident statistics for the zone, and a mobile object flow rate for the zone.

The weather in a geographic zone may be determined based on weather sensors (e.g., temperature sensors, rain sensors, or barometric sensors) physically located with the geographic zone. The weather may be determined from a weather service. Weather conditions such as rain, snow, and fog may increase the confidence threshold such that vehicles must have higher confidence levels in order to enter autonomous mode in the geographic zone.

The traffic in the geographic zone may be determined by a traffic service such as traffic message channel. The traffic may be determined based on the speeds of vehicles in the geographic zones. In one example, when traffic is increased in a geographic zone, the threshold is raised because slower traffic is easier for the autonomous mode to control the vehicle or because the autonomous mode is better adept at spacing vehicle to eliminate the traffic. In another example, when traffic is increased in a geographic zone, the confidence threshold is lowered so that vehicles are more likely to be in manual mode. Road sensors may also report traffic levels.

The type of road and road features may include functional class, which is discussed in more detail below, speed limits, road quality, locations of stop signs and lights, or other road features. As road features are more numerous, roads may be more difficult for the autonomous to manage, and the confidence threshold is increased.

Vehicle data from recent vehicles in the zone in the last predetermined time may impact the zones geographic levels. The vehicle data may include any of the vehicle sensors discussed above. Reported blind spots in the zone may describe places where autonomous mode is more reliable than manual model because automated systems are not affected by driver blind spots. The confidence threshold may be modified based on a mobile object flow rate for the zone. The mobile object flow rate may describe a number of mobile objects (e.g., deer, kids, pets, or other objects) that is expected to flow through the grid. The number of mobile objects may depend on the relative distances to sources of mobile objects (e.g., parks, zoos, wooded areas, playgrounds, or other areas).

The confidence threshold may also be affected by accident statistics or other incidents in the geographic zone. The incident reports may be in near real time, which may be included in traffic data. The incident reports may be a statistic kept over a longer period of time such as the last month, year, or all time available. Higher incident zones could be assigned a higher confidence threshold so that more vehicles are in autonomous mode and may avoid incident. In another example, higher incident zones could be assigned a lower confidence threshold if it is determined a substantial portion of the incident involve vehicles in autonomous mode.

The confidence threshold may be a function of time. Each geographic zone may be assigned multiple confidence threshold based on any of the above factor for multiple time intervals or time epochs. Each geographic zone may be associated with a time matrix stored in the database 123. The matrix may include data for each specific time epoch, or the matrix may include multiple layers or divisions for multiple time epochs. The time epoch corresponds to a time of day, day of week, and/or day of the year. The size of the repeating time epochs may be configurable by the developer. Example sizes include 15 minutes, 30 minutes, 1 hour, or another value. Example time epochs include 5:00 pm-5:15 pm on a weekday, 10:00 am-11:00 am on a Saturday, and 2:00 pm-4:00 pm on the day before Thanksgiving. In the example of 15 minute epochs, the confidence threshold may be formatted into a 96-dimensional vector for each cell of the matrix, in which each of the 96 components describe speed data for a different 15 minute epoch. The size of matrix is a function of the size, or quantity, of the time epochs.

Figure 4A:
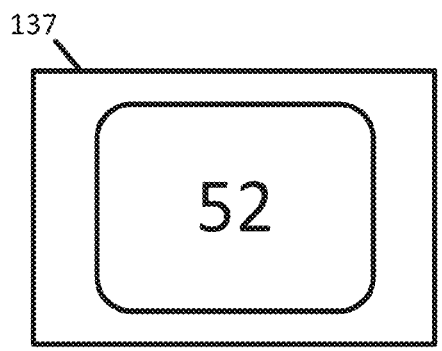
FIG. 4A illustrates an example confidence score display.

FIG. 4A illustrates an example confidence score display 137. The display 137 may be part of computing device 122 (e.g., in dash display, or a mobile device). The display 137 may illustrate a numeric value that represents the current vehicle score of the vehicle 124. The vehicle score may fluctuate according to sensor data received at the computing device 122. In one example, the display 137 includes an absolute value for the vehicle confidence level. In another example, the display 137 includes a differential value that represented the difference between the vehicle confidence level and the threshold. When the vehicle confidence level exceeds the threshold, a positive value is displayed, and when the vehicle confidence level is lower that the threshold, a negative value is displayed.

Figure 4B:
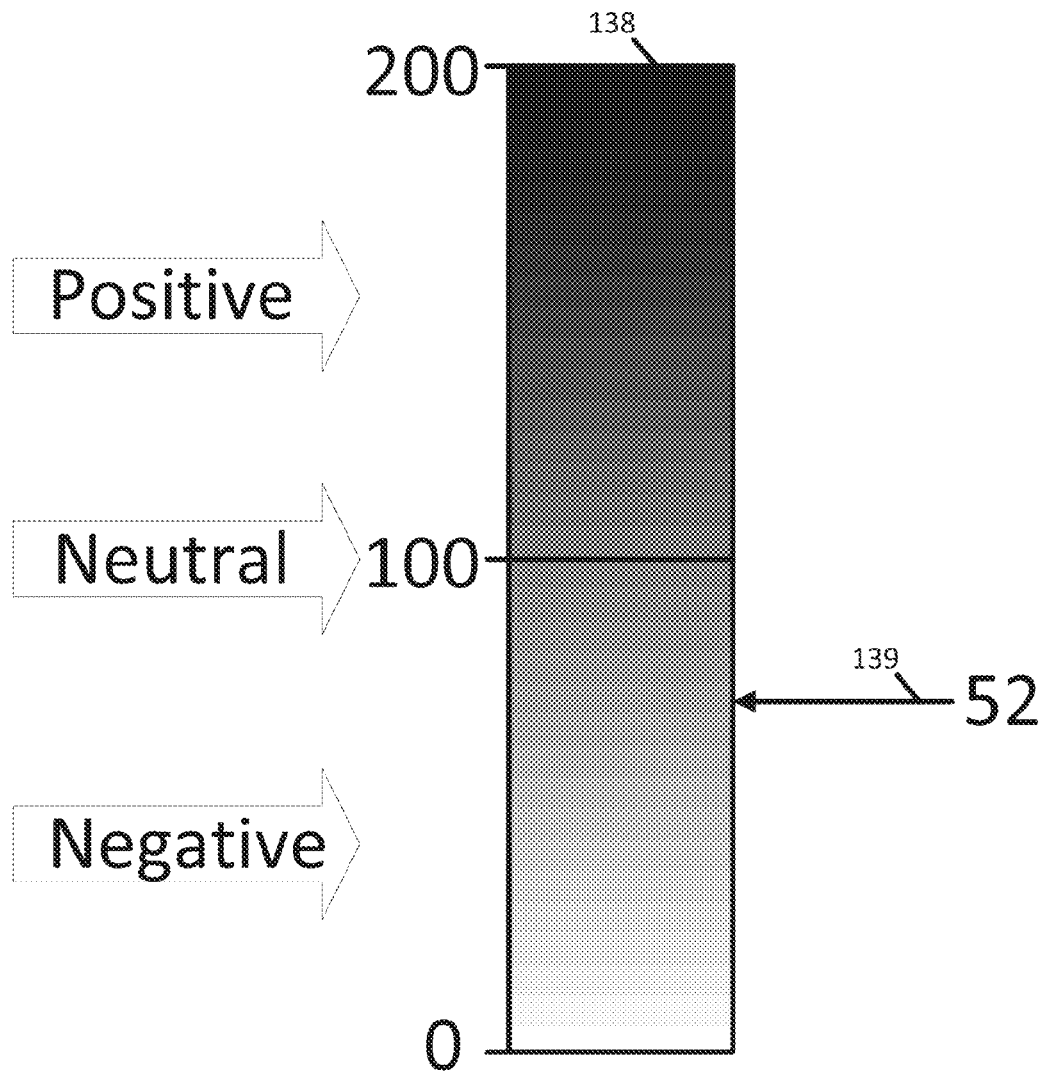
FIG. 4B illustrates another example confidence score display.

FIG. 4B illustrates an example gradient confidence score display 138. The display 138 may include a positive region to indicate the vehicle confidence level exceeds the threshold. The display 138 may include a negative region to indicate the vehicle confidence level exceeds is less than the threshold. The display 138 may include a neutral within a predetermined range (e.g., 5%) of the threshold value. Indicia (e.g., arrow 139) may indicate the current vehicle confidence value.

The positive portion of the display 138 may be broken down into multiple ranges. Each range may correspond to a different set of autonomous vehicle functions. A first range, for example from the neutral threshold value to a first tier threshold (e.g., 10 absolute points higher or 10% higher than the threshold value), the autonomous driving computer may include low risk driving functions. Low risk driving functions may include windshield wiper control, headlight operation, and cruise control.

A second range, for example from the first tier threshold value to a second tier threshold (e.g., 20 absolute points higher or 20% higher than the threshold value), the autonomous driving computer may include medium risk driving functions. Medium risk driving functions may include speed control, gear shifting or lane departure prevention. Speed control may prevent the vehicle from moving within a predetermined range of the vehicle ahead or from exceeding the speed limit. Gear shifting may control the transmission of the vehicle to supplement speed control. Lane departure prevention may make minor steering adjustments based on the lane of travel through detect roadway lines or location tracking.

A third range, for example from the second threshold value to a third tier threshold (e.g., 50 absolute points higher, 50% higher than the threshold value, or an open ended maximum value), the autonomous driving computer may include high risk driving functions. High risk driving functions may be full automated driving including steering, speed control, gear shifting, and braking.

FIG. 5A illustrates an example look up table 145 for confidence thresholds or the confidence scores of the geographic zones. The lookup table may be stored at the server 125, the database 123, or at the computing device 122. The table 145 illustrates a correlation between functional class of paths and the corresponding threshold value for the geographic zone.

In one example, the geographic zone relates to individual road segments, and the threshold value for the road segments is based on functional class and any of the other factors above. In another example, the geographic zone includes paths of multiple functional classifications. The zone's geographic threshold may be multiplied by a multiplier depending on the functional classes of the individual path segments. The multipliers may be selected such that smaller roads (higher functional class) have a higher multiplier, which results in a higher threshold value and reduced the amount of autonomous driving available on that path segment.

Table 1 lists example classification systems that may be assigned numeric values for functional class.

TABLE 1

| Simple System | Complex System | U.S. Long Distance Roads | Highway Tags |
|---|---|---|---|
| Arterial Road | Interstates | Interstate Expressway | Motorway |
| Collector Road | Principal Arteries | Federal Highway | Trunk |
| Local Road | Minor Arteries | State Highway | Primary |
| | Major Collector | County Highway | Secondary |
| | Minor Collector | Local Road | Tertiary |
| | Local Road | | Residential |

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size.

Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Alternatively, the database 123 may list road width or lane quantities. The server 125 may access the database for the road width according to the geographic location reported by the computing device 122 and assign a multiplier to the threshold value of the zone based on road width or the number of lanes.

FIG. 5B illustrates another example look up table 147 for vehicle confidence score. As discussed above, the confidence score for a vehicle may dependent on data received from a variety of sensors, which may be classified by sensor category. In addition, to the sensor data returned by the sensors, the vehicle confidence scores may also depend on the quality of the data from the sensors. The quality of the data, or correctness, may depend on the component being monitored, the accuracy of the sensor, and the lifespan of the component or the sensor.

Correctness may be a function of the quantity of sensors in a particular category that are operating correctly. Operation of a sensor may be deemed correct based on the expected lifetime of the sensor or based on a statistical analysis (e.g., variance, standard deviation) of the output of the sensor.

The confidence value for a vehicle may be calculated based on the correctness of one or more of the sensor categories. For example, a correctness multiplier may be multiplied by the vehicles confidence value based on the correctness or quantity of fully functioning sensors in any category. Table 147 illustrates example categories driving sensors, road status sensors, and parking sensors. In one example, the correctness multiplier is lower than 1 when less than a predetermined number (e.g., 10) of sensors is operating correctly. Three sensors out of an expected value of 10 may result in a correctness multiplier of 0.3. In another example, different sensor categories are weighted differently.

Figure 6A:
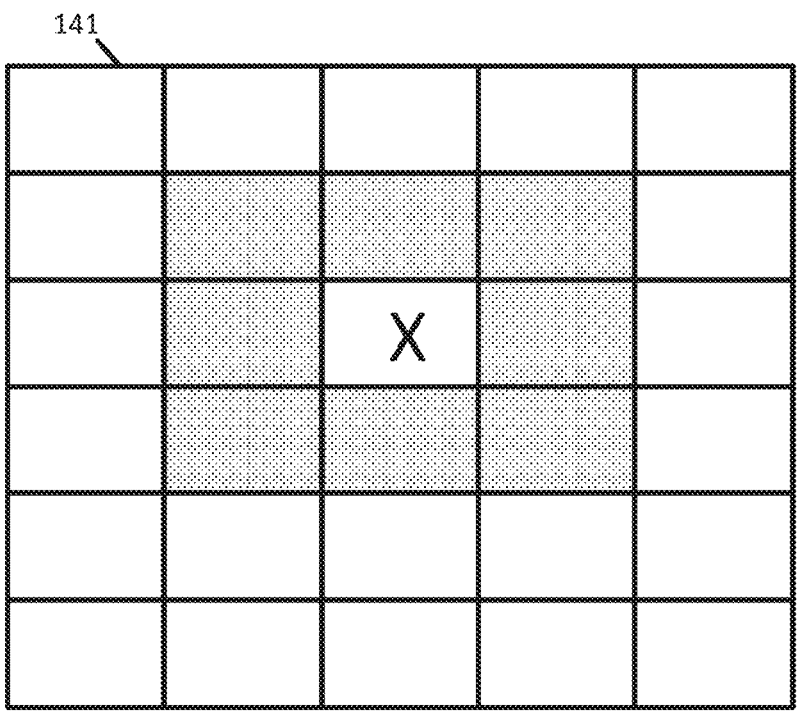
FIG. 6A illustrates an example grid neighborhood.

FIG. 6A illustrates an example grid neighborhood of geographic zones. The current zone (e.g., current location of the vehicle) is marked by an X. Neighborhoods for the current geographic zones of various sizes may be identified by the server 125. The server 125 may request and/or automatically receive data from vehicles in the other zones. In one example, the server 125 requests data from other vehicles when the correctness multiplier, or individual quantities of functioning sensors for a particular category, fall below a predetermined number.

The server 125 may identify one or more vehicles in an adjacent geographic zone, as illustrated by the shaded zones in FIG. 6A. In one example, the rain sensor for a vehicle in geographic zone X is not functioning or outputting unreliable data. The server 125 may analyze location data from other vehicles to identify one or more vehicles in the neighboring geographic zones. Alternatively, the server 125 may identify one or more vehicles on the same or downstream road segments from the vehicle with a malfunctioning sensor. The server 125 is configured to increase the vehicle confidence level based on the sensor data from the one or more other vehicles.

Figure 6B:
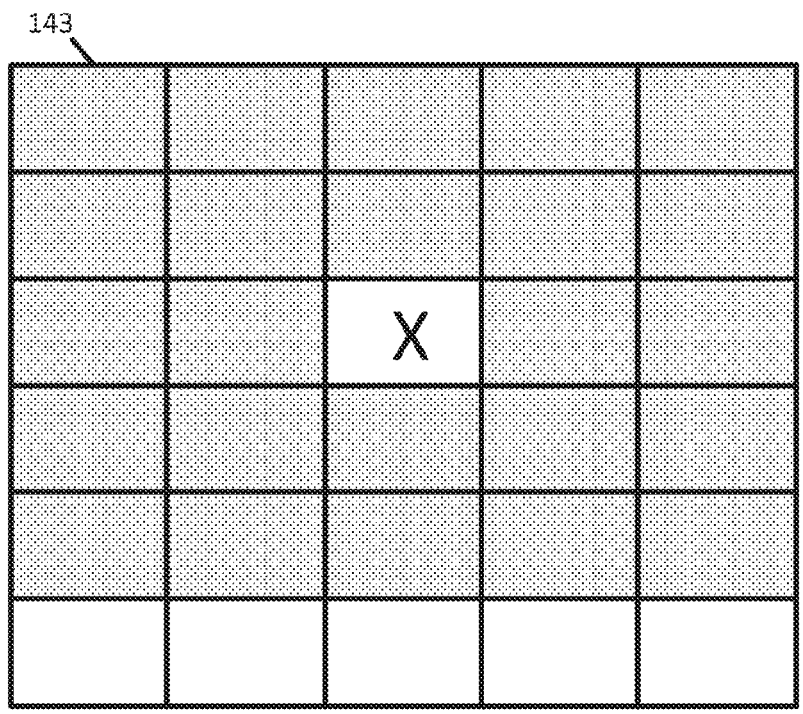
FIG. 6B illustrates another example grid neighborhood.

In one example, the server 125 may adjust the size of the neighboring zones. A larger neighboring zone is shown by the shaded area in FIG. 6B. The server 125 may identify that the vehicle confidence score for a vehicle is below the confidence threshold (e.g., because one or more sensors are inoperable). The server 125 may request additional sensor data from adjacent geographic zones. If no such data is available or is not sufficient to increase the vehicle confidence score to the threshold for the zone, the server 125 may increase the size of the neighboring zones, and request additional sensor data from vehicles in the additional geographic zones. This process of increasing the size of the neighboring zones from which data is received may be repeated until a maximum size is reached or adequate sensor data is received to increase the vehicle confidence score to the confidence threshold.

The exchange of sensor data may also occur directly between vehicles. If the computing device 122 determines that the vehicle confidence score for a vehicle is less than the required confidence threshold, the vehicle may send a communication to nearby vehicles using WiMax, dedicated short range communications (DSRC), 802.11, Bluetooth, cellular, or other communication protocols.

Figure 7:
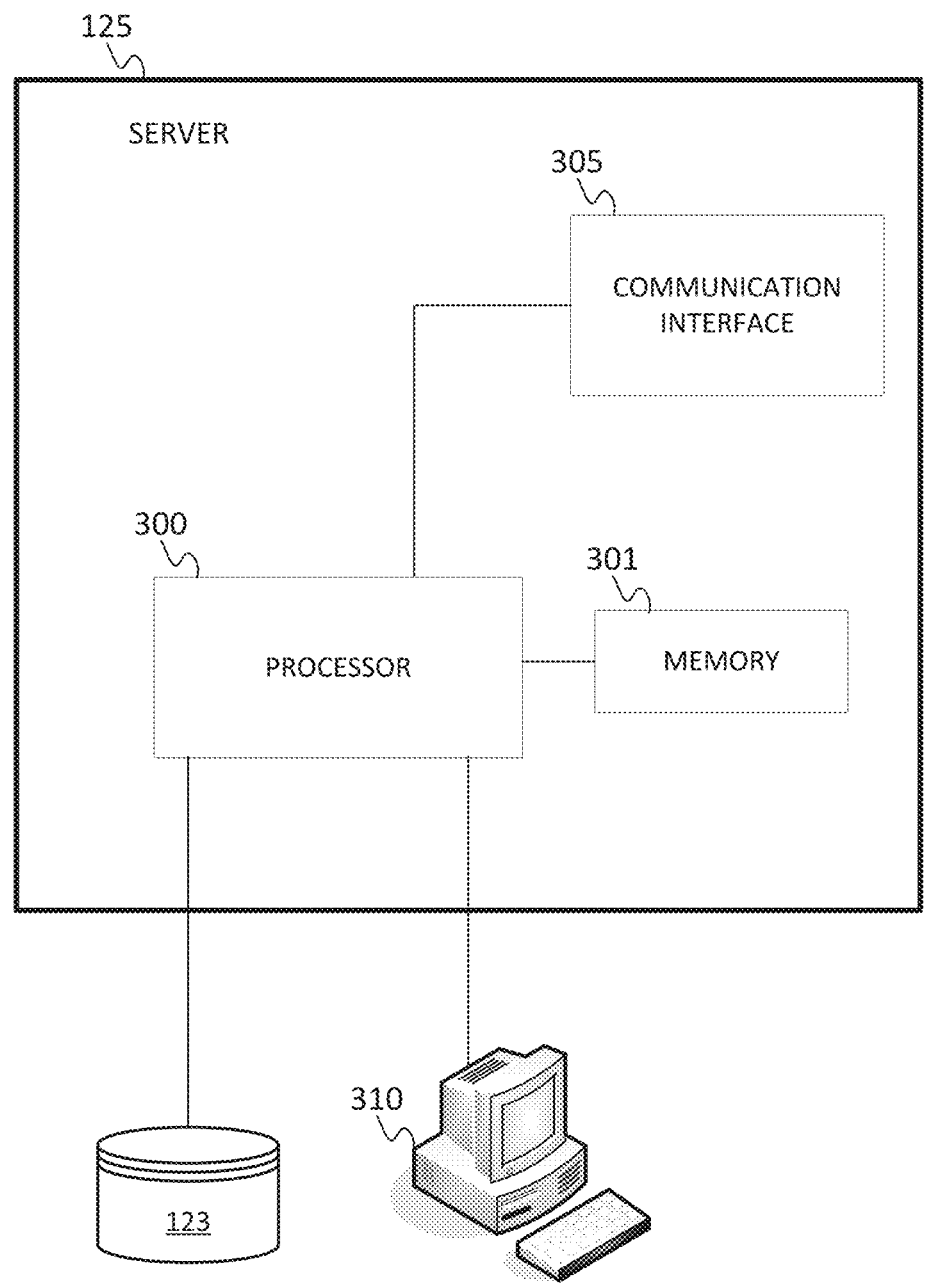
FIG. 7 illustrates an exemplary server of the system of FIG. 1.
Figure 8:
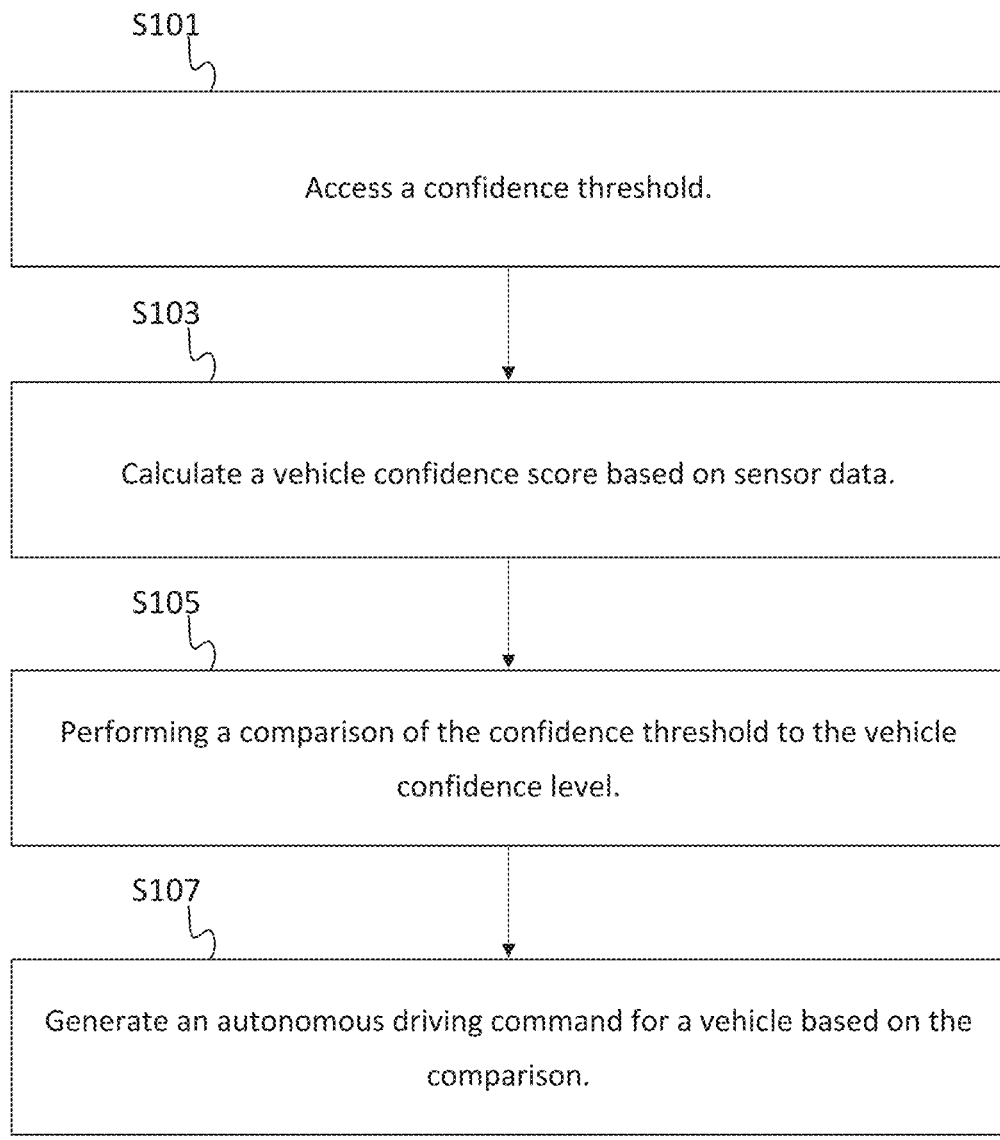
FIG. 8 illustrates example flowchart for mode transition for an autonomous vehicle.

FIG. 7 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the computing device 122. Additional, different, or fewer components may be included. FIG. 8 illustrates an example flowchart for dynamic traffic rendering. The acts of FIG. 8 may be performed by the server 125 or another device. Additional, different, or fewer acts may be provided.

At act S101, the processor 300 accesses a confidence threshold. The confidence threshold may be stored in memory 301. The confidence threshold may be received by the communication interface 305 from another device such as a geographic database or traffic service. The confidence threshold may be static. Alternatively, the confidence threshold may be a function of geographic location and/or a function of time and vary according to time of day, day of week, and conditions (e.g., weather in proximity of the vehicle, traffic in proximity of the vehicle, event calendars for locations in proximity of the vehicle, or other variables).

At act S103, the processor 300 calculates a vehicle confidence score for a specific vehicle based on sensor data. The sensor data may be received from the specific vehicle or from multiple vehicles. The sensor data may be from a traffic camera or other traffic sensor and received from a traffic service.

At act S105, the processor 300 compares the confidence threshold to the vehicle confidence level. At act S107, the processor 300 generates an autonomous driving command for a vehicle based on the comparison. The processor 300 may send the autonomous driving command to the vehicle. The autonomous driving command may select a mode (e.g., normal driving versus autonomous driving). The autonomous driving command may select a classification of driving commands. One classification may correspond to steering and navigation, another classification may correspond to speed and lane centering, and a third classification may correspond to cruise control and headlight control.

The vehicle confidence score may also be a function of the driver. Some drivers (e.g., inexperienced drivers, young drivers, or accident prone drivers) may be assigned higher vehicle confidence scores so that the autonomous driving mode is more likely to be selected. Other drivers (e.g., experienced drivers, accident free drivers, higher licensed drivers such as chauffeurs) may be assigned lower confidence scores so that the autonomous driving mode is less likely to be selected.

Figure 9:
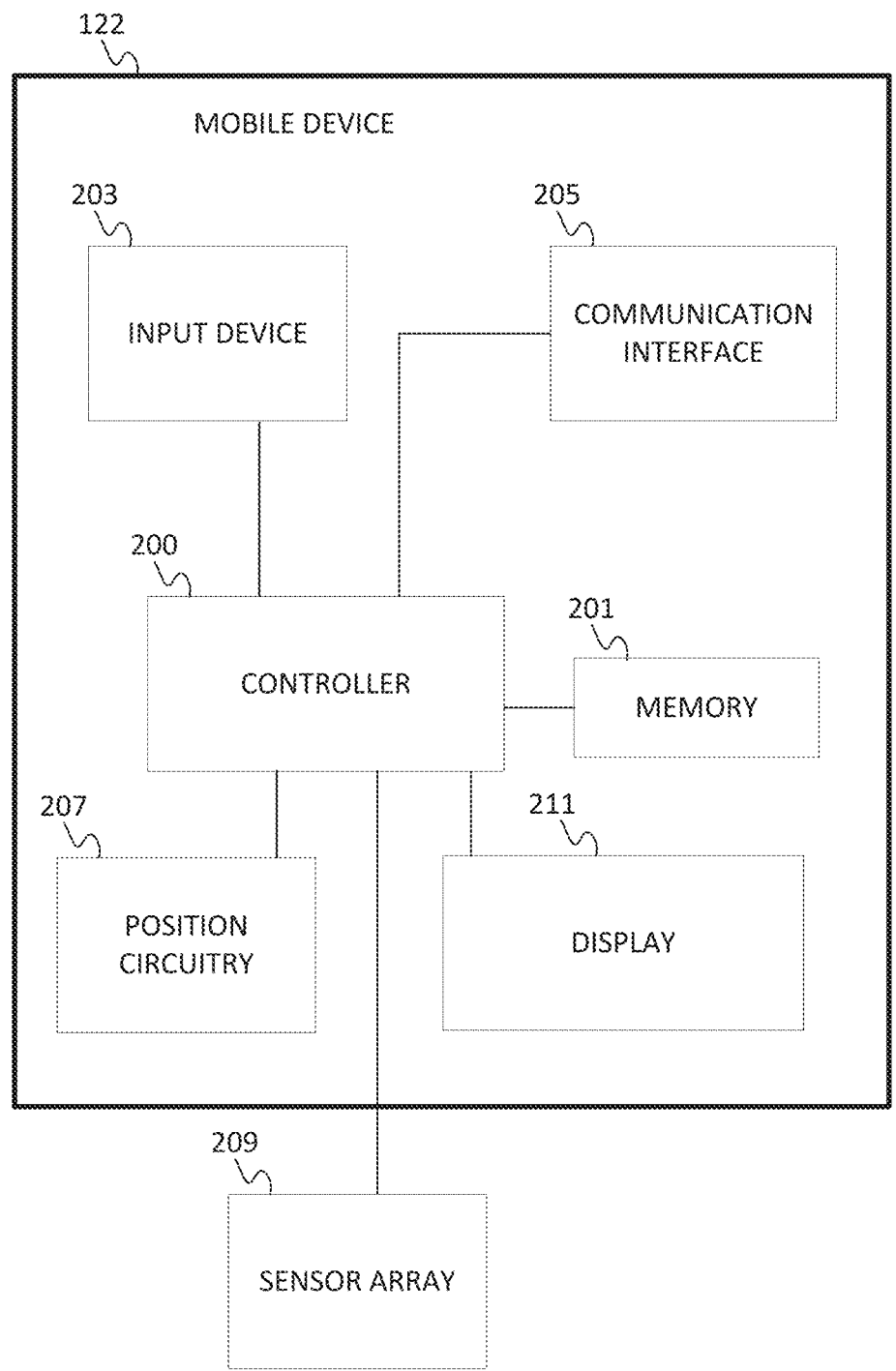
FIG. 9 illustrates an exemplary computing device of the system of FIG. 1.

FIG. 9 illustrates an exemplary computing device 122 of the system of FIG. 1. The computing device 122 may be referred to as a navigation device. The computing device 122 includes a controller 200, a memory 201, an input device 203, a communication interface 205, position circuitry 207, and a display 211. The workstation 128 may include at least a memory and processor and may be substituted for the mobile device in the following.

Figure 10:
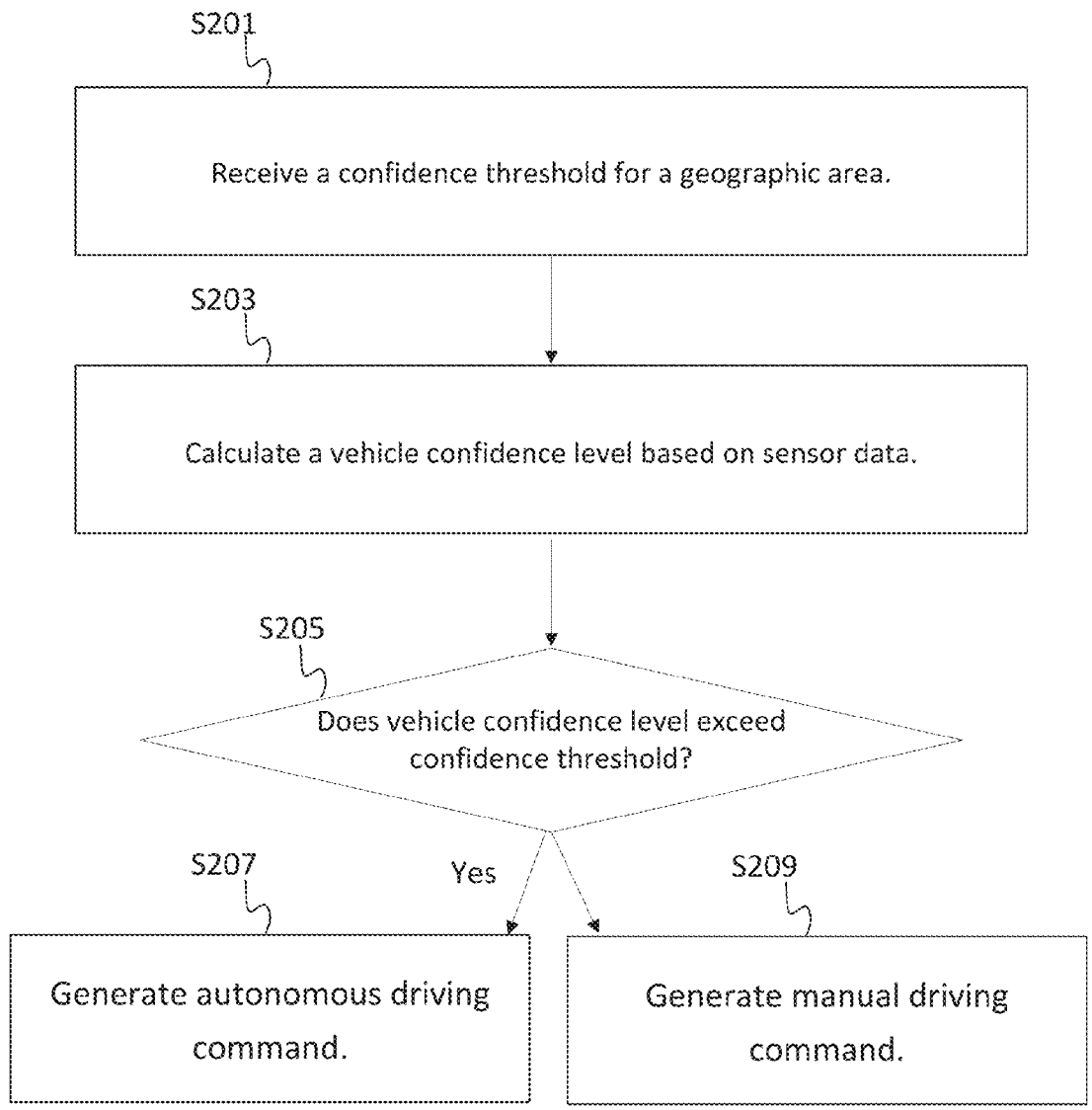
FIG. 10 illustrates another example for mode transition for an autonomous vehicle.

FIG. 10 illustrates an example flowchart for transitioning an autonomous vehicle. The acts of FIG. 10 may be performed by the computing device 122 or another device. Additional, different, or fewer acts may be provided.

At act S201, the controller 200 accesses a confidence threshold for a geographic area. The confidence threshold may be received through the communication interface 205 or from the memory 201. In one example, a user may manually enter the confidence threshold to input device 203 based on user preference or external instructions. For example, various levels for the confidence threshold may be assigned depending on the availability of autonomous driving infrastructure. The confidence threshold may be updated by a service technician through the input device 203.

At act S203, the controller 200 calculates a vehicle confidence level based on sensor data received from sensor array 209. The sensory array 209 may include any combination of the sensors described above. The vehicle confidence level may be based on the conditions of the roadway or the environment of the car, the condition of traffic on the roadway, or the type of roadway.

At act S205, the controller 200 compares the confidence threshold to the vehicle confidence level. At act S207, the controller 200 generates a manual mode command for a vehicle when the confidence threshold exceeds the vehicle confidence level. The manual mode command may instruct the vehicle to enter normal driving mode or remain in normal driving mode. At act S209, the controller 200 generates an autonomous mode command for the vehicle when the vehicle confidence level exceeds the confidence threshold.

In one example, the confidence threshold for transitioning from autonomous mode to manual mode is different that the confidence threshold for transitioning from manual mode to autonomous mode. Such a hysteresis affect may be used to prevent rapid transitions between the modes.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylist pen, trackball, rocker switch, touch pad, voice recognition circuit, or other device or component for inputting data to the computing device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the computing device 122. The positioning system may also include a receiver and correlation chip to obtain a GPS signal. Alternatively or additionally, the one or more detectors or sensors may include an accelerometer built or embedded into or within the interior of the computing device 122. The accelerometer is operable to detect, recognize, or measure the rate of change of translational and/or rotational movement of the computing device 122. The computing device 122 receives location data from the positioning system. The location data indicates the location of the computing device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    accessing, from a database, a confidence threshold for a geographic area, wherein the geographic area has at least one geographic characteristic;
    calculating, using a processor, a vehicle confidence level based on at least one confidence factor;
    performing a comparison of the confidence threshold to the vehicle confidence level, wherein the confidence threshold corresponds to the at least one geographic characteristic;
    generating a driving mode command for a vehicle based on the comparison; and
    transitioning, automatically using the processor, the vehicle to or from an autonomous driving mode based on the vehicle mode command when the comparison is within the confidence threshold for the geographic area based on the at least one geographic characteristic.

2. The method of claim 1, wherein the at least one confidence factor includes sensor data from one or more sensors.

3. The method of claim 2, wherein the one or more sensors include a weather sensor, a driving sensor, a road status sensor, or a parking sensor.

4. The method of claim 2, wherein the at least one confidence factor includes correctness data.

5. The method of claim 1, further comprising:
receiving location data for the vehicle in the geographic area, wherein the database is accessed according to the location data for the confidence threshold for the geographic area.

6. The method of claim 1, further comprising:
adjusting the vehicle confidence level based on a quantity of sensors.

7. The method of claim 1, further comprising:
receiving sensor data from a second vehicle; and
increasing the vehicle confidence level based on the sensor data from the second vehicle.

8. The method of claim 1, wherein the vehicle confidence level is based on sensor data for weather in the geographic area and sensor data for operation of the vehicle.

9. The method of claim 8, wherein the sensor data for weather in the geographic data is a combination of real-time data and historical data.

10. The method of claim 1, wherein transitioning the vehicle comprises:
transitioning from a manual driving mode to an autonomous driving mode based on the vehicle mode command.

11. The method of claim 1, wherein the geographic characteristic is traffic data in the geographic area.

12. The method of claim 11, wherein when the traffic data shows an increase in traffic in a geographic zone, compared to a historical baseline of traffic, the confidence threshold is raised or lowered.

13. An apparatus comprising:
at least one processor; and
at least one memory including computer program code for one or more programs, the at least one memory and the computer program code configured to, with the at least one processor, cause the apparatus to at least perform:
accessing a confidence threshold for at least one geographic area;
calculating a vehicle confidence score based on sensor data;
performing a comparison of the confidence threshold to the vehicle confidence score, wherein the confidence threshold corresponds to the at least one geographic area; and
generating an autonomous driving command for a vehicle based on the comparison,
wherein the autonomous driving command includes a transition to autonomous mode or a transition to manual mode when the comparison is within the confidence threshold for the at least one geographic area.

14. The apparatus of claim 13, wherein sensor data describes weather in proximity of the vehicle or traffic in proximity of the vehicle.

15. The apparatus of claim 13, wherein sensor data describes correctness of an array of sensors.

16. The apparatus of claim 13, wherein sensor data describes a road status for a road the vehicle is traveling on.

17. The apparatus of claim 13, the at least one memory and the computer program code configured to, with the at least one processor, cause the apparatus to at least perform:
receiving sensor data from a second vehicle; and
increasing the vehicle confidence score based on the sensor data from the second vehicle.

18. The apparatus of claim 13, wherein the autonomous driving command includes an automatic transition to autonomous mode.

19. The apparatus of claim 13, wherein the sensor data includes first sensor data for weather in the vicinity of the vehicle and second sensor data for operation of the vehicle.

* * * * *